United States Patent Office 2,914,492
Patented Nov. 24, 1959

2,914,492

DEPIGMENTING ALKENYL AROMATIC POLYMER COMPOSITIONS BY THE COMBINED PIGMENT-SETTLING ACTION OF AN ALIPHATIC CARBOXYLIC ACID AND A DIATOMACEOUS FILTER AID

Wallis R. Bennett and Claude A. Cummins, Midland, Mich., assignors to The Dow Chemical Company, Midland, Mich., a corporation of Delaware No Drawing. Application April 5, 1957
Serial No. 650,842

6 Claims. (Cl. 260—2.3)

This invention relates to an improved process for depigmenting alkenyl aromatic polymer compositions, particularly polystyrene, in order to reclaim the polymeric constituent therefrom for subsequent reuse in place of or in combination with virgin polymer stock.

It is a common practice to pigment polymer compositions including alkenyl aromatic polymer compositions for coloration, delustering and various other purposes. Among the more popular pigments, for example, are cadmium and selenium compounds, titania, the several chromium oxides and the like. In the usual methods that are invoked for the reclamation and recovery of polymeric constituents from pigmented polymer compositions, it is generally necessary to dissolve the composition in a solvent suitable therefor and to filter the resulting solution free from the insoluble pigment that is contained therein. This may oftentimes be difficult and tedious. The recovery may frequently be rendered even more painstaking by the impossibility of rapidly filtering the solution, due to the tendency of many pigments to remain suspended in and to settle very slowly from the solution that is made up of the pigmented polymeric composition (usually scrap or off-grade material) being reclaimed. It is the principal object of the present invention to provide an improved method for depigmenting alkenyl aromatic polymer compositions, including polystyrene, to facilitate the easier and more economically attractive reclamation and recovery of the polymer constituent thereof. Other objects, advantages, and benefits of the invention will be manifest in the ensuing description and specification.

To this end, pigmented alkenyl aromatic polymer compositions may advantageously be depigmented by practice of a process in accordance with the process of the present invention which comprises dissolving in a suitable solvent a pigmented polymeric composition that is desired to be reclaimed; incorporating in the resulting polymer solution minor proportions of (1) acetic acid or an equivalent low molecular weight aliphatic carboxylic acid containing not more than 5 carbon atoms and (2) a diatomaceous filter aid; intimately mixing the acid and filter aid with the polymer solution containing suspended pigment to cause the pigment to settle from the solution in the form of relatively large flocs or curds that are in combination with said filter aid; separating the pigment containing curds from the polymer solution; and subsequently isolating and recovering the reclaimed and purified polymer. While it is known to employ diatomaceous filter aid alone for purposes of increasing the filter rate of pigment-containing polymer solutions for purposes of their being depigmented, the conventional procedures that employ filter aid do not cause the pigment to be settled from the polymer in the form of large, easily removable flocs or curds. Surprisingly enough, the combination of the filter aid and acetic or an equivalent acid causes coagulation of the pigment in such extremely beneficial and easily separable manner. The literally amazing form of pigment settling and coagulation with the filter aid that is effected by practice of the process of the present invention conveniently permits the most efficient reclamation and recovery of scrap polymer being depigmented. The reclaimed product is generally obtained in a condition of purity and freedom from contamination by pigment materials that is equivalent to that of virgin stock with the desired result being achieved, as indicated, with utmost expedience and minimized operational difficulty.

Any alkenyl aromatic resin can be reclaimed from scrap or other pigment compositions by the process of the present invention. As the term is conventionally understood, such resins include the normally solid polymers of such vinyl aromatic compounds as styrene, the several chloro styrenes, the several methyl styrenes (including vinyl toluene), the several ethyl styrenes, vinyl napthalene and the like as well as the solid resinous copolymers of such compounds with one another and with other unsaturated monomeric materials includnig acrylonitrile, methyl methacrylate, ethyl acrylate and other mono-ethylenically unsaturated monomers and divinyl benzene or diallyl maleate. Advantageously, as has been indicated, the process is practiced for the depigmentation of polystyrene and various styrene copolymers.

Any non-reactive organic solvent liquid may be employed in the practice of the invention for dissolving the scrap polymer composition that is to be depigmented and reclaimed. Obviously, the particular solvent that is used depends upon the particular polymer that is involved. For styrene polymers, including polystyrene, it is generally suitable to employ ethyl benzene, xylene, toluene and the like or an equivalent solvent among those that are known for such polymers. When certain styrene polymers, such as copolymers of styrene and acrylonitrile are involved, it may sometimes be preferable to employ relatively more polar solvents, such as methyl ethyl ketone and the like for their dissolution.

It is preferred, as a matter of expedience, to utilize a solvent that is practically effective at normal room temperatures and under normal atmospheric pressure. It is possible, however, to accomplish the dissolution and it may oftentimes be advantageous to conduct the process of the invention at elevated temperatures. It is also possible to employ superatmospheric pressures in combination with an elevated dissolving and treating temperature. In many cases, however, it may be found better to avoid greater than atmospheric pressures in view of the operational difficulties that may thus be involved.

As is apparent, any concentration of the scrap polymer may be made in the solution that is to be depigmented. Ordinarily, if possible, it is advantageous for at least about 5 percent and preferably at least about 10 percent by weight of the pigmented polymer to be dissolved in the organic solvent. This avoids the inconvenience of handling larger than necessary volumes of the desired polymer in solution while permitting a suitable settling effect to be readily accomplished during the depigmentation process without involving intolerable viscosity in the compositions.

The amounts of the acetic acid or its equivalent and the diatomaceous filter aid that may be incorporated in the polymer solution are generally an amount between about 1 and $\frac{1}{10}$ percent by weight of the former and an equal amount by weight of the latter based on the weight of the polymer solution. While more than 1 percent by weight of the acid or filter aid can be employed (say in amounts up to about 5 percent or so by weight of each), it is generally preferable not to use such large quantities for obvious reasons of economy. On the other hand, if less than about $\frac{1}{10}$ percent by weight of either the acid or filter aid is employed, practically no coagulation of the pigment is found to occur. Hence, it is preferable to employ at least the minimum indicated quantities. Ordinarily, between about one-half and one percent by weight of the acid in the filter aid provides satisfactory results in the practice of the invention.

The acid and filter aid may be incorporated in the solution by any conventional mixing or physical agitating technique. In this connection, although the acid and filter aid can be added simultaneously, it is usually beneficial to first incorporate the acid and thoroughly mix it through the solution before adding the filter aid thereto. The acid may be employed in anhydrous form or in the form of aqueous solutions thereof (although its weight is calculated on a water-free basis). Usually, at room temperatures, each treatment may be accomplished within an hour or two in order to form the easily filterable large curds before separating the slurried pigment-containing filter aid from the polymer solution being treated. When elevated temperatures are employed, shorter periods of time may be found to suffice. In this connection, the acid or solution thereof need not be completely miscible in all proportions with the composition or solution of the polymer that is being depigmented. Actually, as a matter of fact, it may even be of distinct benefit and of great desirability to have a disperse aqueous phase, for example, present in the dissolved composition during the pigment precipitation step. If a partially immiscible acid or acid solution is employed, however, it is most advantageous to interpose an additional separation step somewhere in the process to remove the immiscible constituent, as by permitting it to stratify and decanting it from the polymeric solution. When such a step is involved, it is preferably done prior to (or simultaneous with) separation of the precipitated curds of pigment.

The precipitated curds may be separated in any desired manner, including filtration, centrifugation and sedimentation and decantation from the polymer solution. Likewise, after the dissolved polymer has been suitably purified for purposes of its satisfactory reclamation, it may be isolated in any desired manner, including solvent stripping, precipitation in liquid vehicles followed by filtration and the like. In connection with the present process, although it is not usually necessary to do so, it may be desirable to perform the depigmentation treatment in a plural series of steps or stages in each of which the filter aid (and, if desired, additional quantities of the acid) may be added in separate proportions and separately removed from the solvent during each individual stage of the entire treatment.

In order to further illustrate the invention, about 864 grams of off-grade polystyrene containing about 2 percent by weight of titanium dioxide was dissolved in about 7,794 grams of toluene at 25° C. to provide a 10 percent by weight solution of the polymer. To this solution there was added about 17.3 grams of glacial acetic acid and 23.4 grams of water. The aqueous acid was miscible with the polymer solution. The batch was agitated for about one hour with rapid stirring. At the end of the hour, about 17.4 grams of commercially available diatomaceous earth filter aid ("Dicalite Speed Plus") was added to the batch. The batch was continued to be stirred for an additional period of about 1⅔ hours. During this time, the pigment coagulated into very large flocs or curds with the filter aid. These were easily filtered from the solution. The filtered solution was clear and was obtained in a condition in which it was completely free from pigment. The filter rate that was obtained during filtration was equivalent to a rate of about 40.7 gallons of solution per square foot per hour.

Analogous excellent results were also obtained when the above procedure was essentially repeated to remove mixed cadmium sulfides and selenides; hydrated chromium oxide; and the like pigments from various scrap pigmented polystyrene compositions.

The scope and purview of the present invention is to be construed in the light of the heretofore appended claims rather than strictly from the foregoing illustrative description and specification.

What is claimed is:

1. Process for depigmenting an alkenyl aromatic polymer composition containing an inorganic pigment that is insoluble in any organic solvent in which said polymer composition is dissolved, which process comprises dissolving a pigmented polymeric composition in an organic solvent for said polymeric composition that is non-reactive with said polymer and said pigment and in which solvent said pigment is insoluble; incorporating in the solution minor proportions of between about 5 and about $\frac{1}{10}$ percent each, based on the weight of the solution, of (1) an aliphatic monocarboxylic acid that contains not more than 5 carbon atoms in its molecule and (2) a diatomaceous filter aid; intimately mixing the acid and the filter aid with the solution to cause the pigment to settle therefrom with the filter aid in the form of large curds; separating the pigment-containing filter aid from the polymer solution; and subsequently recovering the reclaimed and purified polymer from said solution.

2. The process of claim 1 wherein between about 1 and $\frac{1}{10}$ percent by weight each of the acid and filter aid are incorporated in said solution.

3. The process of claim 1 wherein the acid is acetic acid.

4. The process of claim 1 wherein the polymer is polystyrene.

5. The process of claim 1 wherein the solvent is toluene.

6. The process of claim 1 wherein the pigment containing curds are separated from the polymer solution by filtration.

References Cited in the file of this patent

UNITED STATES PATENTS

| 2,406,558 | Neumann | Aug. 27, 1946 |
| 2,592,616 | Stott et al. | Apr. 15, 1952 |

FOREIGN PATENTS

| 752,860 | Great Britain | July 18, 1956 |